US010971971B1

(12) United States Patent
Sorensen et al.

(10) Patent No.: US 10,971,971 B1
(45) Date of Patent: Apr. 6, 2021

(54) CONVERTING POTENTIAL ENERGY FROM A MIXTURE OF FLUIDS INTO ELECTRIC POWER

(71) Applicants: Jens Ole Sorensen, Rancho Santa Fe, CA (US); Jens Erik Sorensen, Rancho Santa Fe, CA (US)

(72) Inventors: Jens Ole Sorensen, Rancho Santa Fe, CA (US); Jens Erik Sorensen, Rancho Santa Fe, CA (US)

( * ) Notice: Subject to any disclaimer, the term of this patent is extended or adjusted under 35 U.S.C. 154(b) by 0 days.

(21) Appl. No.: 14/990,066

(22) Filed: Jan. 7, 2016

(51) Int. Cl.
*H02K 7/18* (2006.01)
*F03B 17/00* (2006.01)

(52) U.S. Cl.
CPC .......... *H02K 7/1823* (2013.01); *F03B 17/005* (2013.01); *Y10S 415/916* (2013.01)

(58) Field of Classification Search
CPC .. H02K 7/1823; F03B 17/005; Y10S 415/916
USPC ............................................. 290/52, 43, 54
See application file for complete search history.

(56) References Cited

U.S. PATENT DOCUMENTS

| 2,661,488 | A | 12/1953 | Kenan |
| 4,367,627 | A | 1/1983 | Pretini |
| 4,382,365 | A | 5/1983 | Kira et al. |
| 4,391,099 | A | 7/1983 | Sorensen |
| 6,116,027 | A * | 9/2000 | Smith ...................... F02C 6/10 |
| | | | 60/648 |
| 8,365,524 | B2 * | 2/2013 | Dorozenski ............. F03B 17/02 |
| | | | 290/42 |
| 9,032,729 | B2 | 5/2015 | Sorensen |
| 2002/0148222 | A1 * | 10/2002 | Zaslaysky ................. F03D 1/00 |
| | | | 60/398 |
| 2005/0011179 | A1 * | 1/2005 | Ooka ..................... E21B 43/006 |
| | | | 60/39.182 |
| 2011/0011087 | A1 | 1/2011 | Sorensen |
| 2011/0061385 | A1 * | 3/2011 | Baxter .................... F01K 13/00 |
| | | | 60/649 |
| 2012/0272655 | A1 * | 11/2012 | ElKady ..................... F02C 3/14 |
| | | | 60/772 |
| 2012/0326453 | A1 * | 12/2012 | Allard ..................... F01K 13/02 |
| | | | 290/40 R |
| 2013/0106117 | A1 * | 5/2013 | Sites ....................... F01K 23/10 |
| | | | 290/1 R |
| 2015/0337741 | A1 * | 11/2015 | Gassner ................. F02C 6/003 |
| | | | 60/780 |

(Continued)

*Primary Examiner* — Viet P Nguyen
(74) *Attorney, Agent, or Firm* — Knobbe, Martens, Olson & Bear, LLP

(57) ABSTRACT

A system for converting potential energy into electric power from a mixture of gases, such as atmospheric air, including a particular lesser-density-gas, such as nitrogen, and a particular larger-density-gas, such as oxygen. The system includes a gas-separator at an upper-elevation; a gas-flow-conduit that has a gas-exit-port at a lesser-elevation, where the lesser-elevation is significantly lower than the upper-elevation; and an energy-converter positioned on the gas-flow-conduit. The gas-separator is coupled to the gas-exit-port via the gas-flow-conduit. The gas-separator separates the particular larger-density-gas from the gas mixture. The gas-flow-conduit conducts the separated particular larger-density-gas from the gas-separator via the gas-flow-conduit to the energy-converter; and the energy-converter generates electric power from the conducted separated particular larger-density-gas.

12 Claims, 3 Drawing Sheets

(56) References Cited

U.S. PATENT DOCUMENTS

| | | | |
|---|---|---|---|
| 2015/0361833 A1* | 12/2015 | Hinders | F01K 3/242 |
| | | | 290/1 R |
| 2016/0069263 A1* | 3/2016 | Tamura | F02C 3/28 |
| | | | 60/780 |
| 2016/0172954 A1* | 6/2016 | Cotroneo | H02K 44/08 |
| | | | 310/11 |

* cited by examiner

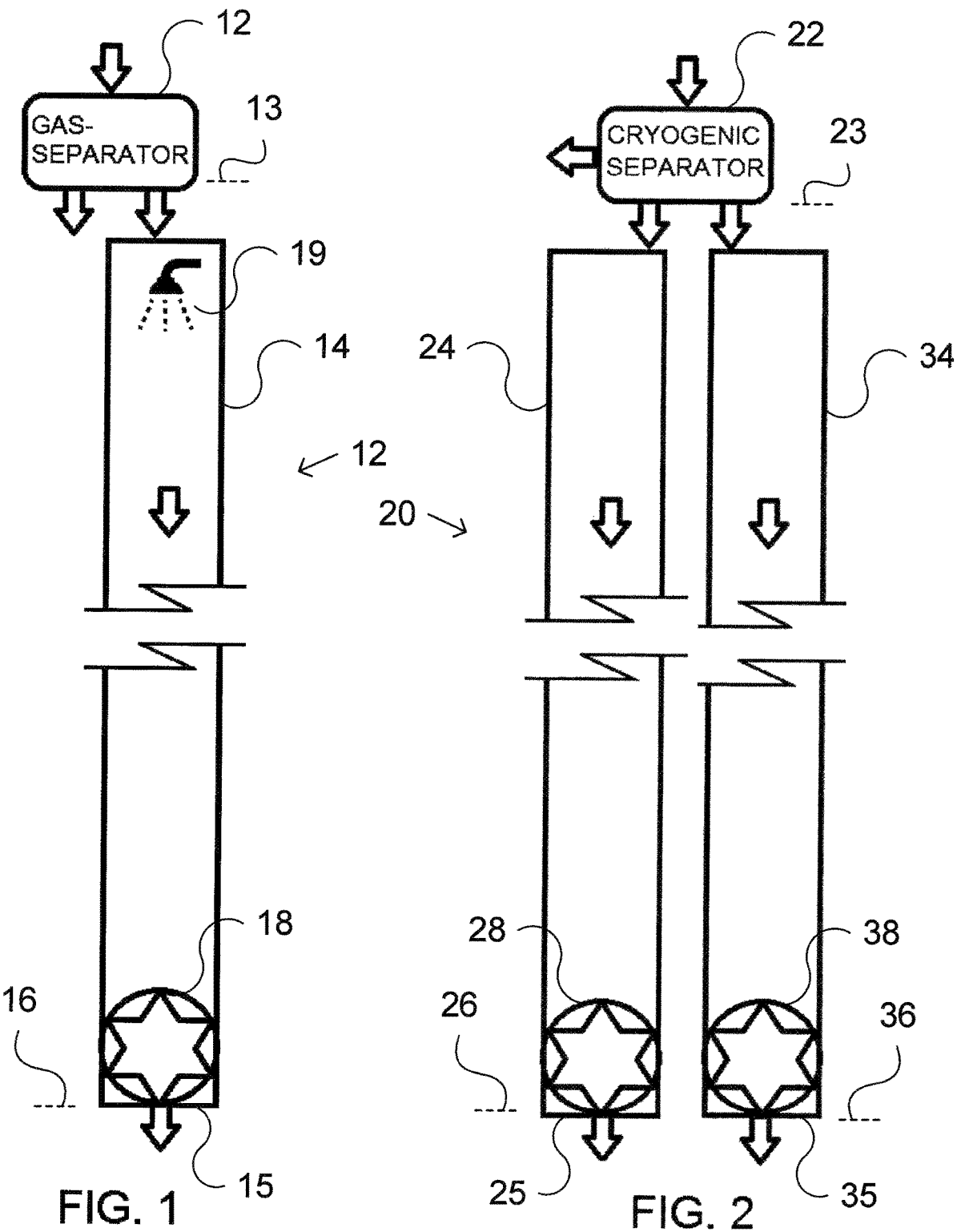

CONVERTING POTENTIAL ENERGY FROM A MIXTURE OF FLUIDS INTO ELECTRIC POWER

BACKGROUND OF THE INVENTION

The invention generally pertains to energy conversion systems and methods and is primarily directed to converting potential energy from a mixture of gases into electric power, wherein the mixture of gases includes gases of different densities, such as oxygen and nitrogen, which is of a lesser density than oxygen. The mixture of gases may be atmospheric air.

SUMMARY OF THE INVENTION

The invention provides sustainable and non-depleteable renewable energy that is not dependent upon such weather conditions as sunshine, wind or waves and is continuously available twenty-four hours a day each day of the year.

The invention provides a method of converting potential energy into electric power from a mixture of fluids including a particular lesser-density-fluid and a particular larger-density-fluid, the method comprising the steps of:

(a) providing a fluid-separator at a first elevation;

(b) providing a fluid-flow-conduit that has a fluid-exit-port at a second elevation that is either a lesser-elevation that is significantly lower than the first elevation or an upper-elevation that is significantly higher than the first elevation;

(c) coupling the fluid-separator to the fluid-exit-port via the fluid-flow-conduit;

(d) positioning an energy-converter on the fluid-flow-conduit;

(e) using the fluid-separator to separate the particular lesser-density-fluid and/or the particular larger-density-fluid from the fluid mixture;

(f) when the fluid-exit-port is at said lesser-elevation, using the fluid-flow-conduit to conduct the separated particular larger-density-fluid from the fluid-separator via the fluid-flow-conduit to the energy-converter, or when the fluid-exit-port is at said upper-elevation, using the fluid-flow-conduit to conduct the separated particular lesser-density-fluid from the fluid-separator via the fluid-flow-conduit to the energy-converter and (g) using the energy-converter to generate electric power from the conducted separated particular density-fluid.

In some embodiments, at least one of the fluids is a gas. In some of these embodiments, the mixture of fluids is atmospheric air, the larger-density-fluid comprises oxygen, and the lesser-density-fluid comprises nitrogen.

The invention also provides systems according to different aspects of the invention.

The different aspects and additional features of the invention are described with reference to the detailed description of the exemplary embodiments.

The separation of gas mixtures into, for example, oxygen and/or nitrogen, and the collection thereof can be an important use of the invention, especially in cases where all the generated power is used for the gas separation process, and could possibly be the only practical use in some embodiments.

BRIEF DESCRIPTION OF THE DRAWING

FIG. 1 is a schematic diagram of an exemplary embodiment of one aspect of the invention.

FIG. 2 is a schematic diagram of an exemplary embodiment of another aspect of the invention.

DETAILED DESCRIPTION

Figures 3, 4:
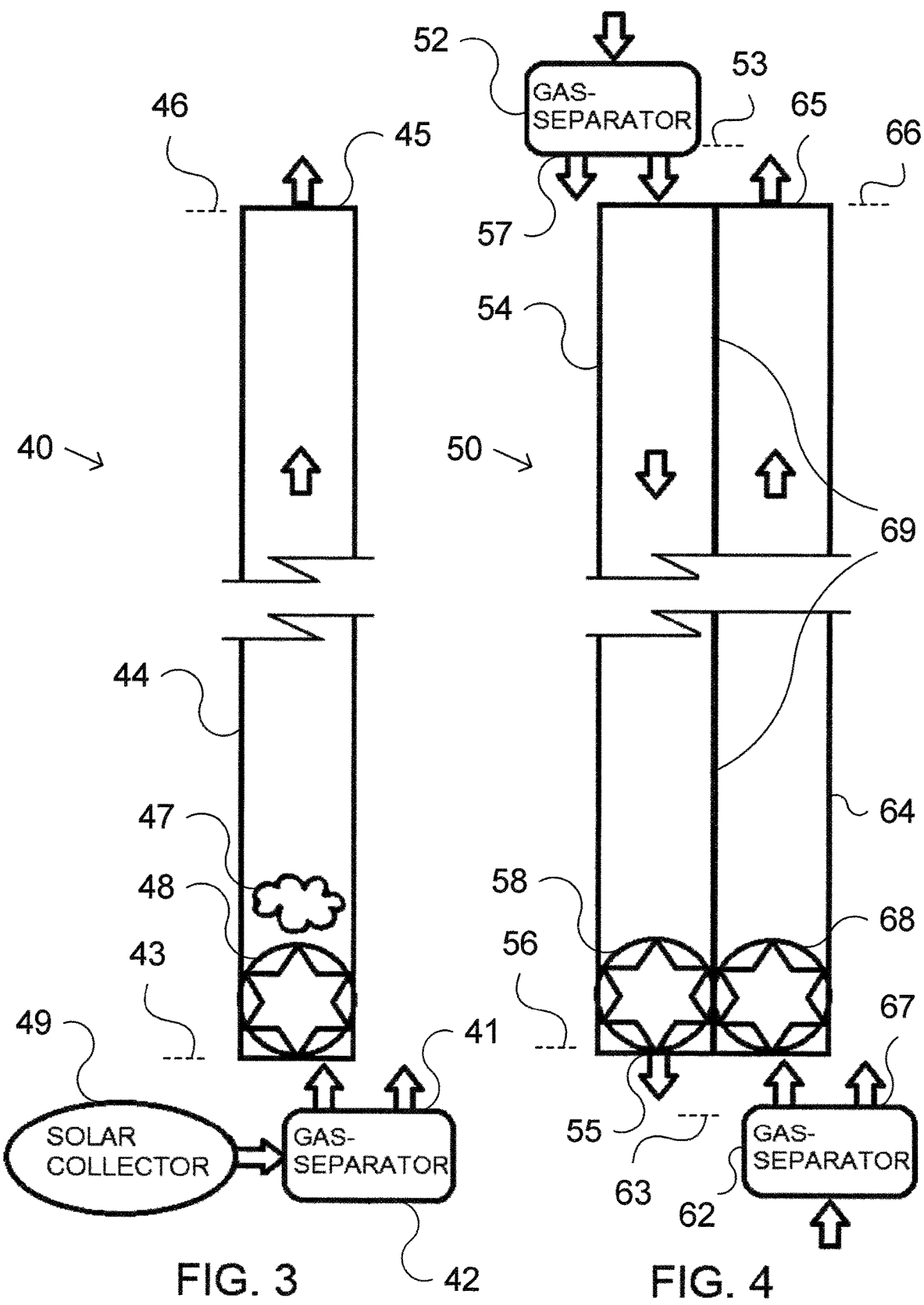
FIG. 3 is a schematic diagram of an exemplary embodiment of still another aspect of the invention.
FIG. 4 is a schematic diagram of an exemplary embodiment of a further aspect of the invention.

Referring to FIG. 1, according to an exemplary embodiment of one aspect of the invention, a system 10 is provided for converting potential energy into electric power from a mixture of gases, including a particular lesser-density-gas and a particular larger-density-gas. The system 10 includes a gas-separator 12 at an upper-elevation 13, a gas-flow-conduit 14 that has a gas-exit-port 15 at a lesser-elevation 16, where the lesser-elevation 16 is significantly lower than the upper-elevation 13, and an energy converter 18, which is positioned on the gas-flow-conduit 14. In some versions of this embodiment, the energy-converter 18 is a turbine generator.

The gas-separator 12 is coupled to the gas-exit-port 15 via the gas-flow-conduit 14.

The gas-separator 12 separates the particular larger-density-gas from the gas mixture.

The gas-flow-conduit 14 conducts the separated particular larger-density-gas from the gas separator 12 to the energy-converter 18; and the energy-converter 18 generates electric power from the conducted separated particular larger-density-gas.

In some versions of this embodiment, a mist and/or droplets of water are introduced into the separated particular larger-density-gas, within the gas-flow-conduit 14, as shown at 19, to thereby cool and/or increase the density of the separated gas. In some such embodiments, the mist and/or droplets of water are introduced into the separated particular larger-density-gas within the gas-flow-conduit 14 near to the gas-separator 12.

In some versions of this embodiment, the particular separated larger-density-gas is collected at the gas-exit-port 15.

In some versions of this embodiment, the energy-converter 18 is coupled to the gas-exit-port 15 at the lesser-elevation 16.

Referring to FIG. 2, according to an exemplary embodiment of another aspect of the invention, a system 20 is provided for converting potential energy into electric power from a mixture of gases, including a particular lesser-density-gas and a particular larger-density-gas. The system 20 includes a cryogenic-fluid-separation-unit 22 at an upper-elevation 23, a first fluid-flow-conduit 24 that has a fluid-exit-port 25 at a lesser-elevation 26, where the lesser-elevation 26 is significantly lower than the upper-elevation 23, and a first energy-converter 28, which is positioned on the fluid-flow-conduit 24. The cryogenic-fluid-separation-unit 22 is coupled to the fluid-exit-port 25 via the fluid-flow-conduit 24.

The cryogenic-fluid-separation-unit 22 liquefies and separates the particular larger-density-gas, such as oxygen, from the mixture of gases, such as the atmosphere, to provide a liquefied gas, such as liquid oxygen. The cryogenic-fluid-separation-unit 22 also separates the particular lesser-density-gas, such as nitrogen, from the mixture of gases, such as the atmosphere.

The first fluid-flow-conduit 24 conducts the separated liquefied particular larger-density-gas from the cryogenic-fluid-separation-unit 22 to the first energy-converter 28; and the first energy-converter 28 generates electric power from the conducted separated liquefied particular larger-density-gas.

The system 20 also includes a gas-flow-conduit 34 that has a gas-exit-port 35 at a second lesser-elevation 36, where the second lesser-elevation 36 is significantly lower than the upper-elevation 23; and a second energy-converter 38, which is positioned on the gas-flow-conduit 34. The cryogenic-fluid-separation-unit 22 is coupled to the gas fluid-exit-port 35 via the gas fluid-flow-conduit 34. The cryogenic-fluid-separation-unit 22 is used to separate the lesser-density-gas from the gas mixture and to cool the lesser-density-gas to thereby increase its relative density.

In some versions of this embodiment, the first energy-converter 28, and/or the second energy converter 38 is a turbine generator.

The gas-flow-conduit 34 conducts the separated particular lesser-density-gas, such as nitrogen, from the cryogenic-fluid-separation-unit 22 to the second energy-converter 38; and the second energy-converter 38 generates electric power from the conducted separated particular lesser-density-gas.

In some versions of this embodiment, the conducted separated liquefied larger-density-gas is collected at the first fluid-exit-port 25 and/or the separated lesser density is collected at the gas exit port 35 and/or from the cryogenic-fluid-separation-unit 22.

Referring to FIG. 3, according to an exemplary embodiment of still another aspect of the invention, a system 40 is provided for converting potential energy into electric power from a mixture of gases, including a particular lesser-density-gas, such as nitrogen, and a particular larger-density-gas, such as oxygen. The system 40 includes a gas-separator 42 at a lesser-elevation 43; a gas-flow-conduit 44 having an upper-elevation-gas-exit-port 45 at a upper-elevation 46, where the lesser-elevation is significantly lower than the upper-elevation; and an energy-converter 48, which is positioned on the gas-flow-conduit 44 at the lesser-elevation 43.

In some versions of this embodiment, the energy-converter 18 is a turbine generator.

The gas-separator 42 is coupled to the upper-elevation-gas-exit-port 45 via the gas-flow-conduit 44.

The gas-separator 42 separates the particular lesser-density-gas from the gas mixture.

In some versions of this embodiment, a gas that includes steam and/or water vapor is introduced into the gas-flow-conduit 44, as shown at 47 to heat and thereby decrease the density of the lesser-density-gas.

In some versions of this embodiment, a gas that includes nitrogen and/or water vapor is introduced into in the gas-flow-conduit 44 near to the gas separator 42, as shown at 47.

In some versions of this embodiment, a gas mixture is heated by a solar collector 49 prior to being introduced into the gas separator 42; and the gas-separator 42 separates the particular lesser-density-gas and the particular larger-density-gas from the heated gas mixture.

The particular lesser-density-gas, such as nitrogen, is collected at the upper-elevation-gas-exit-port 45 and the particular larger-density gas, such as oxygen, is collected from the gas separator 42 at an oxygen-exit-port 41 at the lesser-elevation 43.

In some versions of this embodiment, the energy-converter is coupled to the gas-flow-conduit at the lesser-elevation.

The gas-flow-conduit 44 conducts the separated particular lesser-density-gas from the gas-separator 42 to the energy-converter 48; and the energy-converter 48 generates electric power from the conducted separated particular lesser-density-gas.

Referring to FIG. 4, according to an exemplary embodiment of a further aspect of the invention, a system 50 is provided for converting potential energy into electric power from a mixture of gases, including a particular lesser-density-gas, such as nitrogen, and a particular larger-density-gas, such as oxygen. The system 50 includes a first-gas-separator 52 at a first-upper-elevation 53; a first-gas-flow-conduit 54 having a first-gas-exit-port 55 at a first-lesser-elevation 56, where the first-lesser-elevation 56 is significantly lower than the first-upper-elevation 53; a first-energy-converter 58 positioned on the first-gas-flow-conduit 54; a second-gas-separator 62 at a second-lesser-elevation 63; a second-gas-flow-conduit 64 having a second gas-exit-port 65 at a second-upper-elevation 66, where the second-lesser-elevation 63 is significantly lower than the second-upper-elevation 66; a second-energy-converter 68 positioned on the second-gas-flow-conduit 64; and a heat exchanger 69 between the first-gas-flow-conduit 54 and the second-gas-flow-conduit 64.

The first-gas-flow-conduit 54 couples the first-gas-separator 52 to the first-gas-exit-port 55. The second-gas-flow-conduit 64 couples the second-gas-separator 62 to the second-gas-exit-port 65.

The first-gas-separator 52 separates the particular larger-density-gas from a first gas mixture.

The first-gas-flow-conduit 54 conducts the separated particular larger-density-gas from the first-gas-separator 52 to the first-energy-converter 58; and the first-energy-converter 58 generates electric power from the separated particular larger-density-gas conducted by the first-gas-flow conduit 54.

The second-gas-separator 62 separates the particular lesser-density-gas from a second gas mixture.

The second-gas-flow-conduit 64 conducts the separated particular lesser-density-gas from the second-gas separator 62 to the second energy converter 68; and the second-energy-converter 68 generates electric power from the separated particular lesser-density-gas conducted by the second-gas-flow-conduit 64. In some versions of this embodiment, the first energy-converter 58, and/or the second energy converter 68 is a turbine generator.

The heat exchanger 69 is adapted to induce heat exchange between the separated larger-density-gas conducted by the first-gas-flow-conduit 54 and the separated second-lesser-density-gas conducted by the second-gas-flow-conduit 64.

In some versions of this embodiment, the conducted separated lesser-density-gas is collected from the gas separator 52 at gas-exit port 57 and/or the separated larger-density is collected at the gas-exit port 55 and/or from the gas separator 62 at gas-exit port 67.

Figure 5:
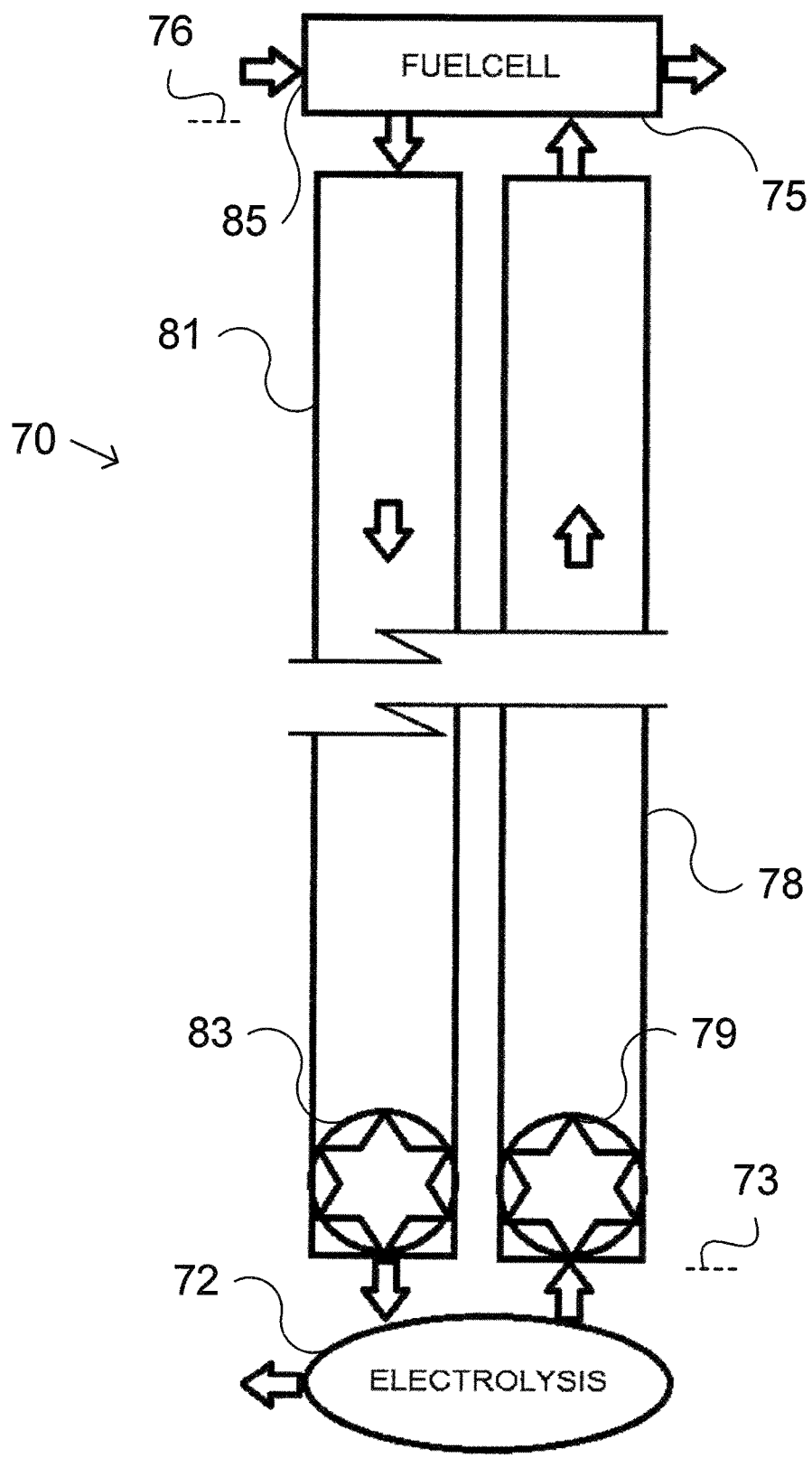
FIG. 5 is a schematic diagram of an exemplary embodiment of still a further aspect of the invention.

Referring to FIG. 5, according to an exemplary embodiment of still a further aspect of the invention, a system 70 is provided for converting potential energy into electric power from a mixture of gases, including a particular lesser-density-gas, such as nitrogen, and a particular larger-density-gas, such as oxygen. The system 70 includes an electrolysis unit 72 at a lesser-elevation 73, a fuel cell unit 75 at an upper-elevation 76, where the lesser-elevation 73 is significantly lower than the upper-elevation 76; a gas-flow-conduit 78 that couples the electrolysis unit 72 with the fuel cell unit 75; a first-energy-converter 79 positioned on the gas-flow-conduit 78; a fluid-flow-conduit 81 that couples the electrolysis unit 72 to the fuel cell unit 75; and a second-energy-converter 83 positioned on the fluid-flow-conduit 81.

The electrolysis unit 72 is adapted to separate some given-density-gas, such as hydrogen, from a working-fluid, such as water by electrolysis.

The gas-flow-conduit 78 conducts the separated given-density-gas from the electrolysis unit 72 to the first-energy-converter 79; and the first-energy-converter 79 generates electric power from the separated given-density-gas conducted via the gas-flow-conduit 78.

The fuel cell unit 75 compounds a working-fluid from a mixture of gases, such as atmospheric air, introduced at an entry port 85 and the separated given-density-gas conducted via the gas-flow-conduit 78.

The fluid-flow-conduit 81 conducts some of the compounded working-fluid from the fuel cell unit 75 to the electrolysis unit 72.

The second-energy converter 83 generates electric power from the compounded working-fluid conducted from the fuel cell 75 by the fluid-flow-conduit 81.

In some versions of the described embodiments, the mixture of gases is other than the atmosphere, and/or particular gases of different densities that are separated from the mixture of gases are other than oxygen and nitrogen.

The following separation features are applicable to various embodiments of the invention;

Fluid separation, including gas separation, may be accomplished by the techniques of swing adsorption, membrane separation, cryogenic separation, cyclonic and centrifugal separation. Swing separation techniques include pressure (PSA), vacuum (VSA) and mixed (VPSA). Membrane separation techniques include pressure and/or vacuum types. Further techniques of separation utilize fuel cells, electrolysis, adsorption, demisters, distillation, drying, elutriation, evaporation, field flow fractionation and/or sublimation. In some embodiments of the invention differences in fluid pressure inherent to the systems may be utilized in the separation processes.

The following conduit features are applicable to various embodiments of the invention;

Conduits for conducting fluids, such as gas and/or liquids, may be provided by vertical chimneys, tower structures, balloon carried conduits, mountainside- or hillside-supported structures, tunnels, stopes, wells, conduits submerged in water, conduits supported by floatation, and/or conduits inserted in tall commercial and/or residential buildings, and/or combinations of the foregoing.

The various individual embodiments according to the different aspects of the invention may incorporate various features of the embodiments according to respective other aspects of the invention to the extent that they are not incompatible.

The benefits specifically stated herein do not necessarily apply to every conceivable embodiment of the present invention. Further, such stated benefits of the present invention are only examples and should not be construed as the only benefits of the present invention.

While the above disclosure contains many specificities that may or may not be common to all of the embodiments described herein, these specificities are not to be construed as limitations on the scope of the claimed invention, but rather as examples of the preferred embodiments described herein. For example, the scope of the method claims should not be construed to cover only methods having the steps occur in the sequence recited herein. Other variations are possible and the scope of the present invention should be determined not by the embodiments described herein but rather by the claims and their legal equivalents. The claims require no implicit limitations. Each claim is to be construed explicitly as stated, or by its legal equivalent.

The invention claimed is:

1. A method of converting potential energy into electric power from a mixture of fluids including a particular lesser-density-fluid and a particular larger-density-fluid, the method comprising the steps of:
   using a fluid-separator located at first elevation to separate at least one of the particular lesser-density-fluid and the particular larger-density-fluid from the fluid mixture, the fluid-separator coupled to a fluid-flow-conduit and in fluid communication with a fluid-exit-port of the fluid-flow-conduit, the fluid-exit-port at a second elevation that is either significantly lower than the first elevation or significantly higher than the first elevation, an energy-converter positioned on the fluid-flow-conduit;
   when the fluid-exit-port is significantly lower than the first elevation, using the fluid-flow-conduit to conduct the separated particular larger-density-fluid from the fluid-separator via the fluid-flow-conduit to the energy-converter, or when the fluid-exit-port is significantly higher than the first elevation, using the fluid-flow-conduit to conduct the separated particular lesser-density-fluid from the fluid-separator via the fluid-flow-conduit to the energy-converter, and
   using the energy-converter to generate electric power from the conducted separated particular density-fluid.

2. The method according to claim 1, wherein at least one of the fluids is a gas.

3. A method of converting potential energy into electric power from a mixture of gases including a particular lesser-density-gas and a particular larger-density-gas, the method comprising the steps of:
   using a gas-separator located at first elevation to separate the particular larger-density-gas from the gas mixture, the gas-separator coupled to a gas-flow-conduit and in fluid communication with a gas-exit-port of the gas-flow-conduit, the gas-exit-port at a second elevation that is significantly lower than the first elevation, an energy-converter positioned on the gas-flow-conduit;
   conducting the separated particular larger-density-gas from the gas-separator via the gas-flow-conduit to the energy-converter; and
   using the energy-converter to generate electric power from the conducted separated particular larger-density-gas.

4. The method according to claim 3, further comprising: introducing a mist and/or droplets of water into the separated particular larger-density-gas.

5. The method according to claim 4, wherein introducing the mist and/or droplets of water into the separated particular larger-density-gas comprises introducing the mist and/or droplets of water into the separated particular larger-density-gas within the gas-flow-conduit near to the gas-separator.

6. The method according to claim 3, further comprising: cooling the separated particular larger-density-gas.

7. The method according to 6, wherein cooling the separated particular larger-density-gas comprises cooling the separated particular larger-density-gas within the gas-flow-conduit near to the gas-separator.

8. The method according to claim 3, further comprising collecting the particular separated larger-density-gas at the gas-exit-port.

9. The method according to claim 3, wherein the energy-converter is coupled to the gas-exit-port at the lesser-elevation.

10. The method according to claim 3, where the gas mixture is atmospheric air, the particular lesser-density-gas comprises nitrogen and the particular larger-density-gas comprises oxygen.

11. The method according to claim 3, where the energy-converter is a turbine generator.

12. A system for converting potential energy into electric power from a mixture of gases including a particular lesser-density-gas and a particular larger-density-gas, the system comprising:
- a gas-separator at an upper-elevation;
- a gas-flow-conduit that has a gas-exit-port at a lesser-elevation, where the lesser-elevation is significantly lower than the upper-elevation; and
- an energy-converter positioned on the gas-flow-conduit;
- wherein the gas-separator is coupled to the gas-exit-port via the gas-flow-conduit;
- wherein the gas-separator is adapted to separate the particular larger-density-gas from the gas mixture;
- wherein the gas-flow-conduit is adapted to conduct the separated particular larger-density-gas from the gas-separator via the gas-flow-conduit to the energy-converter; and
- wherein the energy-converter is adapted to generate electric power from said conducted separated particular larger-density-gas.

\* \* \* \* \*